United States Patent
Takagi et al.

(10) Patent No.: US 11,685,046 B2
(45) Date of Patent: *Jun. 27, 2023

(54) CONTINUUM ROBOT CONTROL METHODS AND APPARATUS

(71) Applicant: Canon USA Inc., Melville, NY (US)

(72) Inventors: Kiyoshi Takagi, Tokyo (JP); Yusuke Tanaka, Tokyo (JP); Takahisa Kato, Brookline, MA (US); Hitoshi Nakamura, Boston, MA (US)

(73) Assignee: Canon U.S.A., Inc., Melville, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/233,150

(22) Filed: Apr. 16, 2021

(65) Prior Publication Data

US 2021/0229277 A1    Jul. 29, 2021

Related U.S. Application Data

(63) Continuation of application No. 16/029,461, filed on Jul. 6, 2018, now Pat. No. 11,007,641.

(60) Provisional application No. 62/533,466, filed on Jul. 17, 2017.

(51) Int. Cl.
| | |
|---|---|
| *B25J 9/16* | (2006.01) |
| *B25J 9/00* | (2006.01) |
| *B25J 9/06* | (2006.01) |
| *B25J 9/10* | (2006.01) |

(52) U.S. Cl.
CPC ............ *B25J 9/1625* (2013.01); *B25J 9/0015* (2013.01); *B25J 9/065* (2013.01); *B25J 9/104* (2013.01)

(58) Field of Classification Search
CPC ........ B25J 9/1625; B25J 9/0015; B25J 9/065; B25J 9/104
See application file for complete search history.

(56) References Cited

U.S. PATENT DOCUMENTS

| | | | | |
|---|---|---|---|---|
| 2009/0024141 A1* | 1/2009 | Stabler | ................... | A61B 34/30 606/130 |
| 2009/0137875 A1* | 5/2009 | Kitagawa | ............. | A61B 1/0055 600/146 |
| 2010/0280525 A1* | 11/2010 | Alvarez | ............... | A61B 1/0055 606/130 |
| 2011/0196199 A1* | 8/2011 | Donhowe | ............... | A61B 1/009 600/102 |
| 2013/0131868 A1* | 5/2013 | Rucker | ...................... | B25J 9/16 700/262 |
| 2013/0300537 A1* | 11/2013 | Bajo | ........................ | B25J 9/163 340/8.1 |
| 2014/0148759 A1* | 5/2014 | Macnamara | ...... | A61M 25/0147 604/95.04 |
| 2014/0330432 A1* | 11/2014 | Simaan | .................. | B25J 9/1625 700/250 |
| 2016/0338698 A1* | 11/2016 | Cardinale | ............ | A61B 17/064 |

(Continued)

*Primary Examiner* — Kira Nguyen

(74) *Attorney, Agent, or Firm* — Canon U.S.A., Inc., IP Division

(57) ABSTRACT

A continuum robot having at least two independently manipulateable bendable section for advancing the robot through a passage, without contacting fragile elements within the passage, wherein the robot incorporates control algorithms that enable the continuum robot to operate and advance into the passage, as well as the systems and procedures associated with the continuum robot and said functionality.

11 Claims, 14 Drawing Sheets

(56) References Cited

U.S. PATENT DOCUMENTS

2017/0354319 A1* 12/2017 Sato ................ A61B 1/0052
2018/0071492 A1* 3/2018 Laby ............... A61M 25/0155

* cited by examiner

CONTINUUM ROBOT CONTROL METHODS AND APPARATUS

CROSS REFERENCE TO RELATED PATENT APPLICATIONS

This application is a continuation of U.S. patent application Ser. No. 16/029,461, filed on Jul. 6, 2018, which claims priority from U.S. Provisional Patent Application No. 62/533,466 filed on Jul. 17, 2017, in the United States Patent and Trademark Office, the disclosure of which is incorporated herein in its entirety by reference.

FIELD OF THE DISCLOSURE

The present disclosure relates to a control system of a continuum robot. More particularly, the present disclosure is directed toward methods, systems and apparatus for a continuum robot configured with independently manipulateable bendable section for advancing the robot through a passage, without contacting fragile elements within the passage.

BACKGROUND OF THE DISCLOSURE

A continuum robot includes a plurality of bending sections having a flexible structure, wherein the shape of the continuum robot is controlled by deforming the bending sections. The robot mainly has two advantages over a robot including rigid links. The first advantage is that the continuum robot can move along a curve in a narrow space or in an environment with scattered objects in which the rigid link robot may get stuck. The second advantage is that it is possible to operate the continuum robot without damaging surrounding fragile elements because the continuum robot has intrinsic flexibility.

As such, the detection of an external force, which is required for the rigid link robot, is unnecessary. Taking advantages of these characteristics, it is expected that the continuum robot could be advantageously applied in the medical field, such as an endoscope sheath and a catheter, and to a robot for hazardous situations, such as a rescue robot. United States Patent Publication No. 2012/279 to Belson Amir (hereafter "PL1") describes a control method for enabling a continuum robot, which is used as an endoscope, for advancement into a space.

However, with the method taught in PL1, every pair of adjacent bending sections are controlled so that the bending shape of a leading section becomes the bending shape of the following section as an endoscope base advances, and thereby the shape is continuously propagated, which may lead to unwanted contact with fragile elements as the endoscope is advanced.

Furthermore, when the continuum robot is used as an endoscope by setting an image-capturing device at the most distal end of the continuum robot, a motion of temporarily stopping the base and looking around (which is referred to as a "look-around motion") is performed. However, the control method of continuously propagating the bending posture of the most distal end to the following bending section by the length of the bending section is applied to the look-around motion, the look-around motion of the most distal end is propagated to the following bending posture, and the continuum robot becomes more likely to contact elements in a small and narrow space. Thus, the method has problems in that the continuum robot cannot advance into a small and narrow space as friction increases due to increase of a normal force with an obstacle and the continuum robot becomes more likely to break.

Accordingly, it would be particularly beneficial to devise methods, systems and apparatus which would allow for advancement of a medical device without contacting elements, all the while allowing for look-around functionality, as well as other medical functions desirable in a medical diagnosis, probing or surgical setting.

SUMMARY

Thus, to address such exemplary needs in the industry, the presently disclosed apparatus teaches a robotic apparatus comprising: a continuum robot including a plurality of bending sections including a distal bending section and a proximal bending section wherein each of the bending sections are bent by at least one wire; a driver that drives the wire; a controller that controls a driving amount of the wire; and a base affixed to the continuum robot and capable of moving the continuum robot, wherein, when a base moves the continuum robot a displacement value, the distal bending section performs a rotational motion, and an angle ($\zeta t$) of the rotational motion is 360 degrees or more, and the controller controls the proximal bending section so as to follow the distal bending section while preventing the proximal bending section from performing a rotational motion of 360 degrees or more, based on a bending state of the distal bending section at a time when the distal bending section finishes the rotational motion.

In various embodiments, the robot apparatus controller may calculate an angle ($\zeta t'$) that is 0 degrees or more and 360 degrees or less and the angle ($\zeta t'$) has a same phase as the angle ($\zeta t$) of the rotational motion, and performs bending control of the proximal bending section based on the calculated angle ($\zeta t'$).

In other embodiment, the robotic apparatus controller may perform bending control of the proximal bending section based on a value obtained by calculating an angle ($\zeta t'$) obtained by using the following formulas using the angle ($\zeta t$) of the rotational motion of the distal bending section $$\zeta t' = \zeta t \bmod 2\pi (\zeta t > 2\pi)$$

$$\zeta t' = \zeta t \bmod -2\pi (\zeta t < -2\pi).$$

In yet additional embodiments, the robotic apparatus further provides, wherein, regarding the proximal bending section, the controller calculates an angle ($\zeta t''$) that is −180 degrees or more and less than 180 degrees and that has a same phase as the angle ($\zeta t$) of the rotational motion, and performs bending control of the proximal bending section based on $\zeta t''$.

In additional embodiments, the controller performs bending control of the proximal bending section based on a value obtained by calculating an angle $\zeta t''$ obtained by using the following formulas using the angle ($\zeta t$) of the rotational motion of the distal bending section $$\zeta t' = \zeta t \bmod 2\pi (\zeta t > 2\pi)$$

$$\zeta t' = \zeta t \bmod -2\pi (\zeta t < -2\pi)$$

$$\zeta t'' = -\pi + \zeta t' \bmod \pi (\zeta t' > \pi)$$

$$\zeta t'' = \pi + \zeta t' \bmod -\pi (\zeta t' < -\pi).$$

In another embodiment of the subject robotic apparatus, the controller calculates an angle $\zeta t'''$ obtained by using the following formulas using the angle ($\zeta$t) of the rotational motion of the distal bending section $$\zeta t' = \zeta t \bmod 2\pi (\zeta t > 2\pi)$$

$$\zeta t' = \zeta t \bmod -2\pi (\zeta t < -2\pi)$$

$$\zeta t'' = -\pi + \zeta t' \bmod \pi (\zeta t' > \pi)$$

$$\zeta t'' = \pi + \zeta t' \bmod -\pi (\zeta t' < -\pi)$$

$$\zeta t''' = \zeta t'' - \pi (\pi/2 < \zeta t'' < \pi)$$

$$\zeta t''' = \zeta t'' + \pi (-\pi < \zeta t'' < -\pi/2),$$

calculates an angle $\theta'$ obtained by using the following formula using a bending angle $\theta$ of the distal bending section, $\theta' = -\theta$, and bends the proximal bending section to be in a state in which the proximal bending section is bent at the bending angle $\theta'$ and rotated by the angle $\zeta t'''$ of the rotational motion.

In yet another embodiment, the robotic apparatus discloses wherein, regarding the proximal bending section, when the distal bending section performs a rotational motion while the predetermined base displacement changes by a predetermined value and the angle ($\zeta$t) of the rotational motion is 360 degrees or more, regarding the proximal bending section, an angle ($\zeta$t") that is –180 degrees or more and less than 180 degrees and that has a same phase as the angle of the rotational motion is calculated, and bending control of the proximal bending section is performed based on $\zeta$t".

In various embodiments, the robotic apparatus provided: wherein, regarding the proximal bending section, the controller performs bending control based on bending control of the distal bending section during a period in which the base displacement changes by a predetermined value ($\Delta z'$).

In other embodiments, the robotic apparatus provided: wherein, when the base has the displacement value, the controller determines whether or not the distal bending section performs a rotational motion whose angle ($\zeta$t) is 360 degrees or more.

In yet other embodiments, the robotic apparatus teaches, wherein the distal bending section includes two independent bending sections.

Another embodiment of the subject robot includes further comprising a medial bending section wherein the medial bending section is bent by at least one wire.

The subject disclosure also teaches a continuum robot including a plurality of bending sections including a distal bending section and a proximal bending section wherein each of the bending sections are driven by at least one wire; driving means that drives the wire; control means that controls a wire driving amount from a bending angle and a rotational angle of the continuum robot; and base control means that is capable of mounting the continuum robot and moving the continuum robot, wherein the control means includes a reference table of the bending angle $\theta$f and the rotational angle $\zeta$f at the base displacement, and table rewriting means that rewrites the reference table in accordance with a bending angle $\theta$t and a rotational angle $\zeta$t of a most distal bending section, and wherein the table rewriting means calculates a follower $\zeta$f as a command value of the rotational angle $\zeta$f of a bending section excluding the most distal bending section $$\zeta f' = \zeta t \bmod 2\pi (\zeta t > 2\pi)$$

$$\zeta f' = \zeta t \bmod -2\pi (\zeta t > 2\pi).$$

In other embodiments, the continuum robot control means provides: wherein the table rewriting means calculates a follower $\zeta$f" as the command value of the rotational angle $\zeta$f of the bending section excluding the most distal bending section $$\zeta f'' = -\pi + \zeta t' \bmod \pi (\zeta t' > \pi)$$

$$\zeta f'' = \pi + \zeta t' \bmod -\pi (\zeta t' > -\pi).$$

In yet further embodiments, the subject robot provides: wherein the table rewriting means calculates a follower $\zeta$f''' as the command value of the rotational angle $\zeta$f of the bending section excluding the most distal bending section $$\zeta f''' = \zeta t'' - \pi (\pi/2 < \zeta t'' < \pi)$$

$$\zeta f''' = \zeta t'' + \pi (-\pi < \zeta t'' < -\pi/2).$$

These and other objects, features, and advantages of the present disclosure will become apparent upon reading the following detailed description of exemplary embodiments of the present disclosure, when taken in conjunction with the appended drawings, and provided paragraphs

BRIEF DESCRIPTION OF THE DRAWINGS

Further objects, features and advantages of the present invention will become apparent from the following detailed description when taken in conjunction with the accompanying figures showing illustrative embodiments of the present invention.

Figure 1:
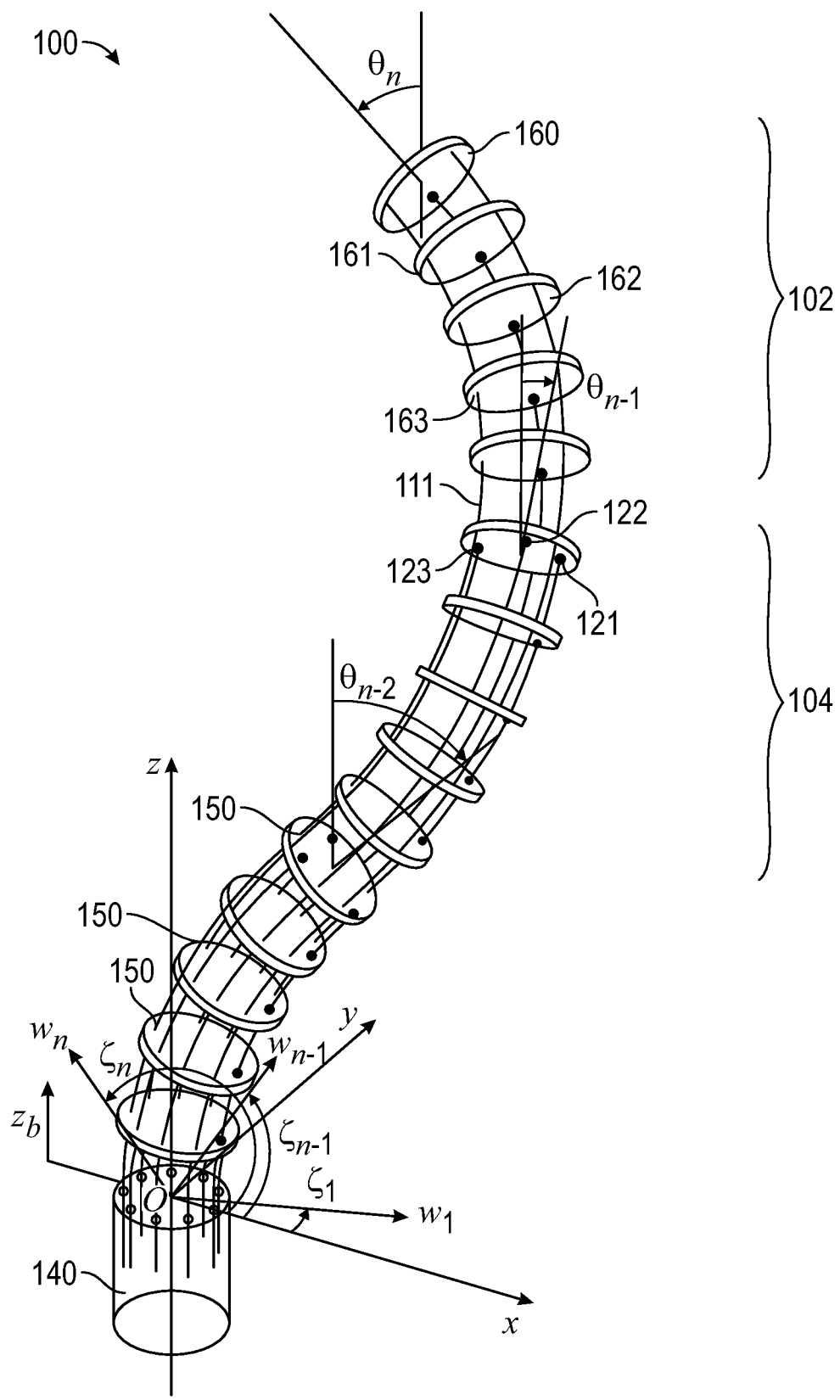
FIG. 1 illustrates a kinematic model of the subject continuum robot, according to one or more embodiment of the subject apparatus, method or system.

Throughout the Figures, the same reference numerals and characters, unless otherwise stated, are used to denote like features, elements, components or portions of the illustrated embodiments. In addition, reference numeral(s) including by the designation "'" (e.g. 12' or 24') signify secondary elements and/or references of the same nature and/or kind. Moreover, while the subject disclosure will now be described in detail with reference to the Figures, it is done so in connection with the illustrative embodiments. It is intended that changes and modifications can be made to the described embodiments without departing from the true scope and spirit of the subject disclosure as defined by the appended paragraphs.

DETAILED DESCRIPTION OF THE DISCLOSURE

In the subject disclosure, Applicant will first detail the mechanism of a continuum robot, followed by the control algorithms that enable the continuum robot to operate and advance into a path, as well as the systems and procedures associated with the continuum robot and said functionality.

First Embodiment

Figure 5A:
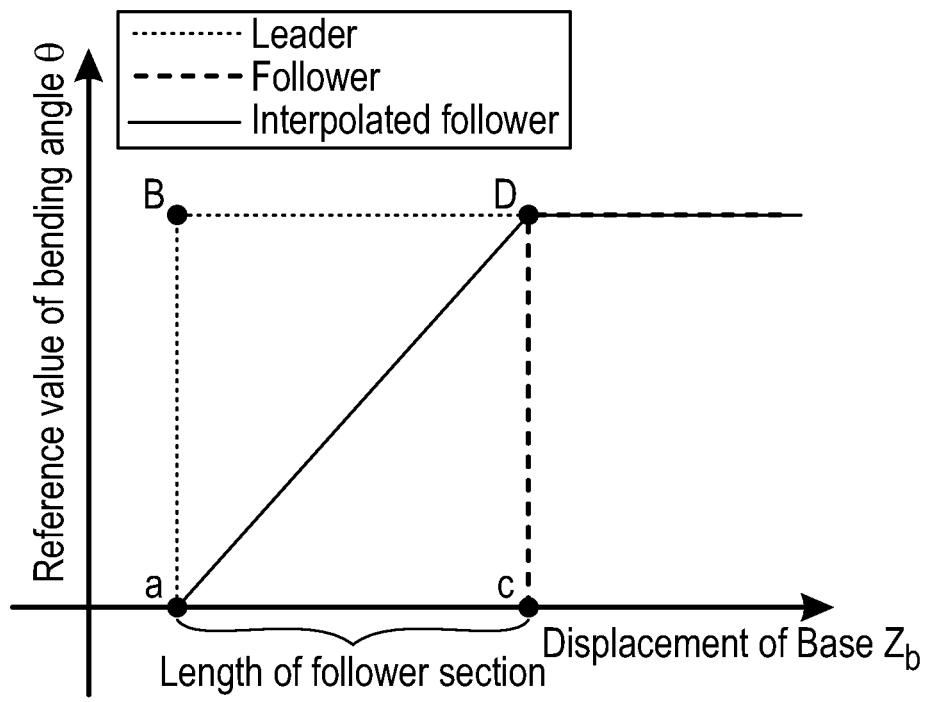
FIGS. 5(a) and 5(b) provide control systems for the subject continuum robot, according to one or more embodiment of the subject apparatus, method or system.
Figure 5B:
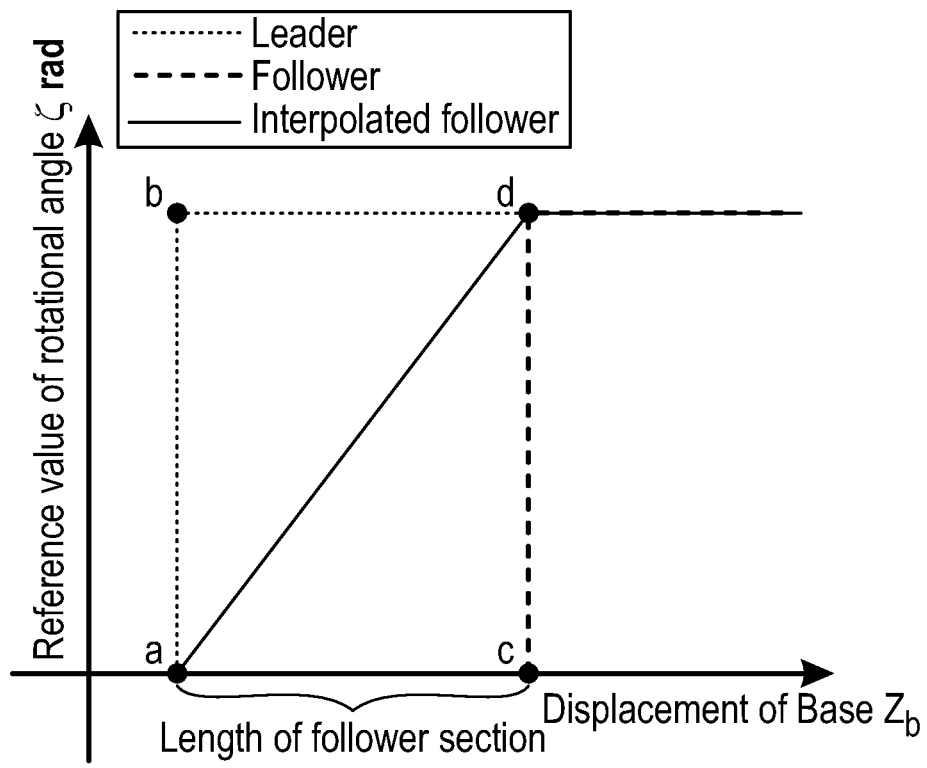
Figure 6:
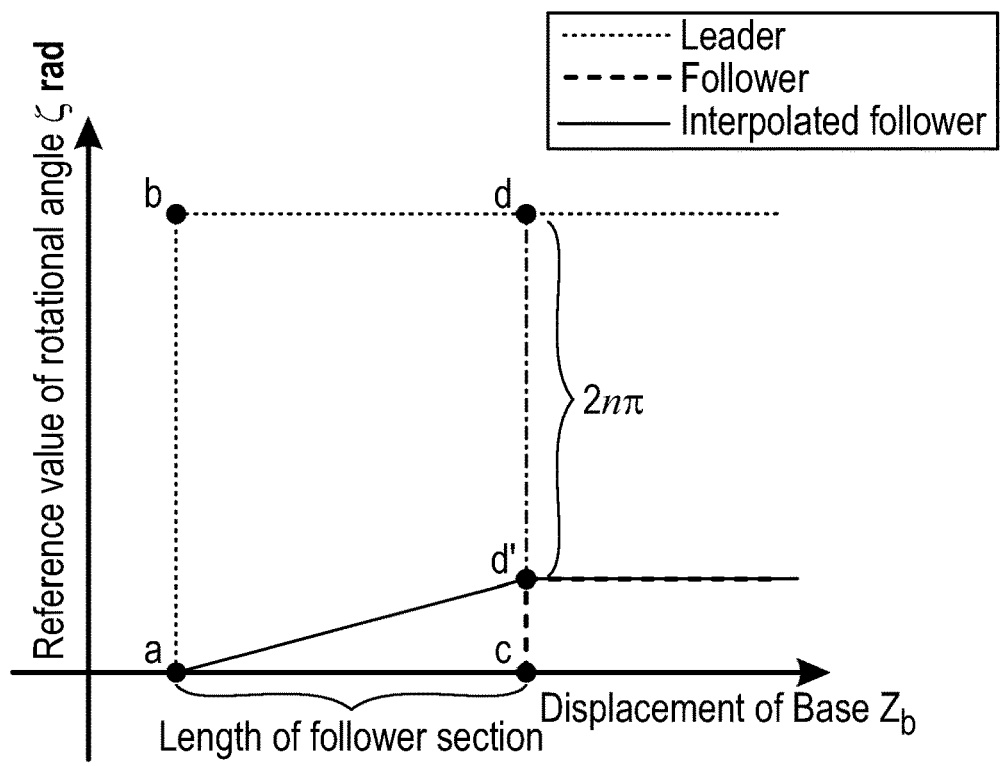
FIG. 6 illustrates the control system for the subject continuum robot, according to one or more embodiment of the subject apparatus, method or system.

FIGS. 5(a) and 5(b) are graphs representing a table of a bending angle command with respect to a base displacement for the robot. When an operator issues a bending command angle aB and a rotation command angle ab at a base displacement a, the bending angle command for a follower may be automatically generated so that the bending angle becomes cD and the rotational angle becomes cd at a base displacement c. This will be referred to as a first leader following control method. Moreover, if the rotational angle ab exceeds $2\pi$ rad, $2n\pi$ rad is subtracted from the rotational angle command as illustrated in FIG. 6. In the present embodiment, this will be referred to as a second leader following control method.

Figure 7:
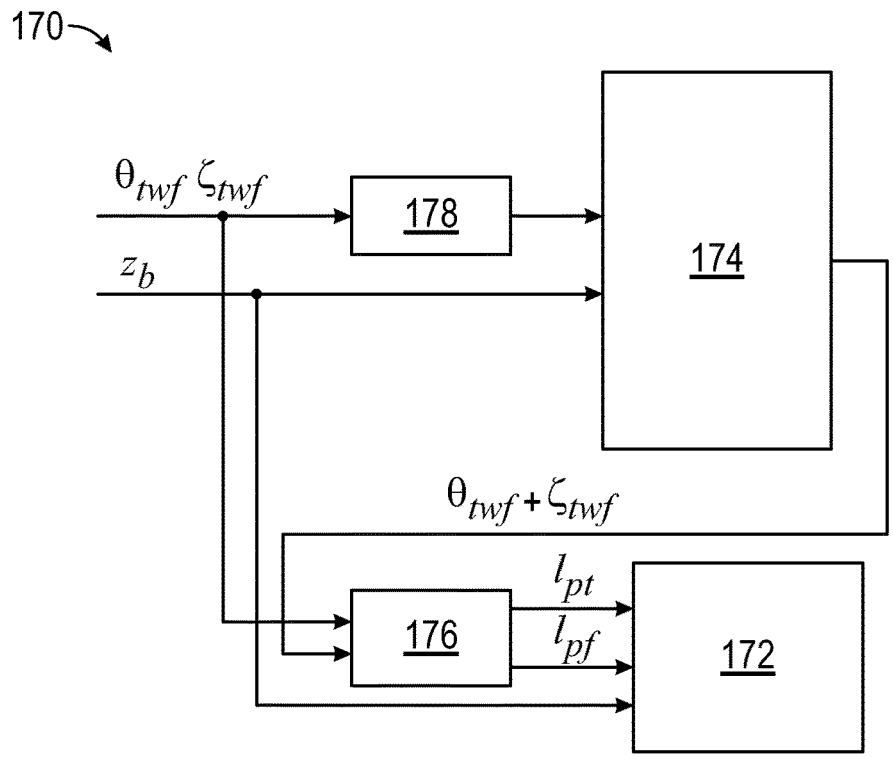
FIG. 7 is a block diagram illustrating the control system of the subject continuum robot, according to one or more embodiment of the subject apparatus, method or system.

FIG. 7 shows a block diagram of the subject continuum robot, according to one or more embodiment of the subject apparatus, method or system. Here, P denotes a control target, FTL denotes a first leader following control algorithm, $\theta_{tref}$ and $\zeta_{tref}$ denote a bending angle command value and a rotational angle command value for the most distal end, $\theta_{fref}$ and $\zeta_{fref}$ denote a bending angle command vector and a rotational angle command vector, $z_b$ denotes a base displacement command value, and the block f denotes a second leader following control algorithm. The block K represents kinematic calculation and calculates a wire driving amount from the bending and rotational angle command values. Details and control results obtained by simulations will be described below.

Figure 2:
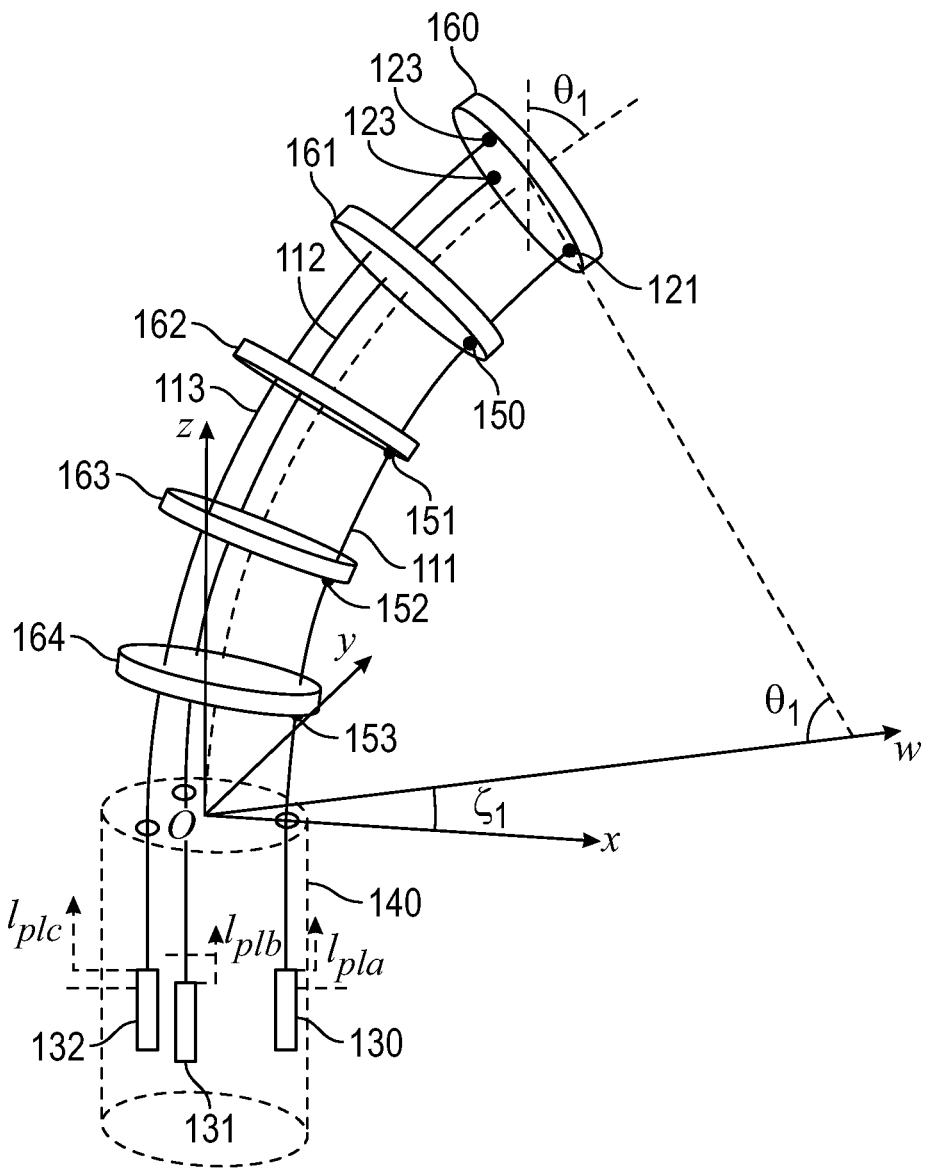
FIG. 2 provides a detailed illustration of the subject continuum robot, according to one or more embodiment of the subject apparatus, method or system.

FIG. 1 illustrates a continuum robot 100 that is capable of a plurality of bends, with FIG. 2 providing an enlarged view of a first bending section 102 at the proximal end 104 of the robot 100.

In the continuum robot 100, wires 111, 112 and 113 are connected to connection portions 121, 122 and 123, respectively, found on an end disc 160 found at the distal end 106 of each bending section 102, Wherein the posture of the bending section 102 is controlled by pushing and pulling the wires 111 to 113 by using actuators 130 to 132 disposed in a robot base 140.

Moreover, the robot base 140 of the continuum robot 100 is disposed on a base stage (not shown) and can be moved by the base stage in the longitudinal direction. Thus, it is possible to advance and retard the robot 100 into a target structure by advancing and retarding the base stage.

A controller (not shown) indicates a driving amount to the base stage and the actuators 130 to 132. Throughout this disclosure, the controller may also be described or eluded to as a control system. The controller may include dedicated hardware including a field-programmable gate array ("FPGA") and the like; or may be a computer including a storage unit, a work memory, and a central processing unit ("CPU"). In the case where the controller is a computer, the storage unit may store a software program corresponding to an algorithm of the control system (described below) and the central processing unit expands the program in the work memory, executes the program line by line, and thereby the computer functions as the controller. In either case, the controller is communicably connected to the base stage and the actuators 130 to 132, and the controller send signals representing the driving amount and configuration to these control targets.

The continuum robot 100 includes wire guides 161 to 164 situated throughout each bending section 102, for guiding the wires 111, 112 and 113, and for providing structural integrity to the bending section 102. The wire guides 161 to 164 each contain a wire through 150-153 for each wire 111-113. For ease of illustration, FIG. 2 only depicts the wire through 150-153 for a single wire 111. Alternatively, a method of discretely arranging the plurality of wire guides, a continuum robot 100 having a bellows-like shape or a mesh-like shape may be utilized, wherein the wire guides 161-164 are fixed to their respective wires 111-113.

With respect to FIGS. 1 and 2, the definitions of symbols are as follows: $l_d$=the length of the central axis a bending section; $\theta_n$=the bending angle of the distal end; $\zeta_n$=the rotational angle of the distal end; $\rho_n$=the radius of curvature of a bending section.

Figure 3:
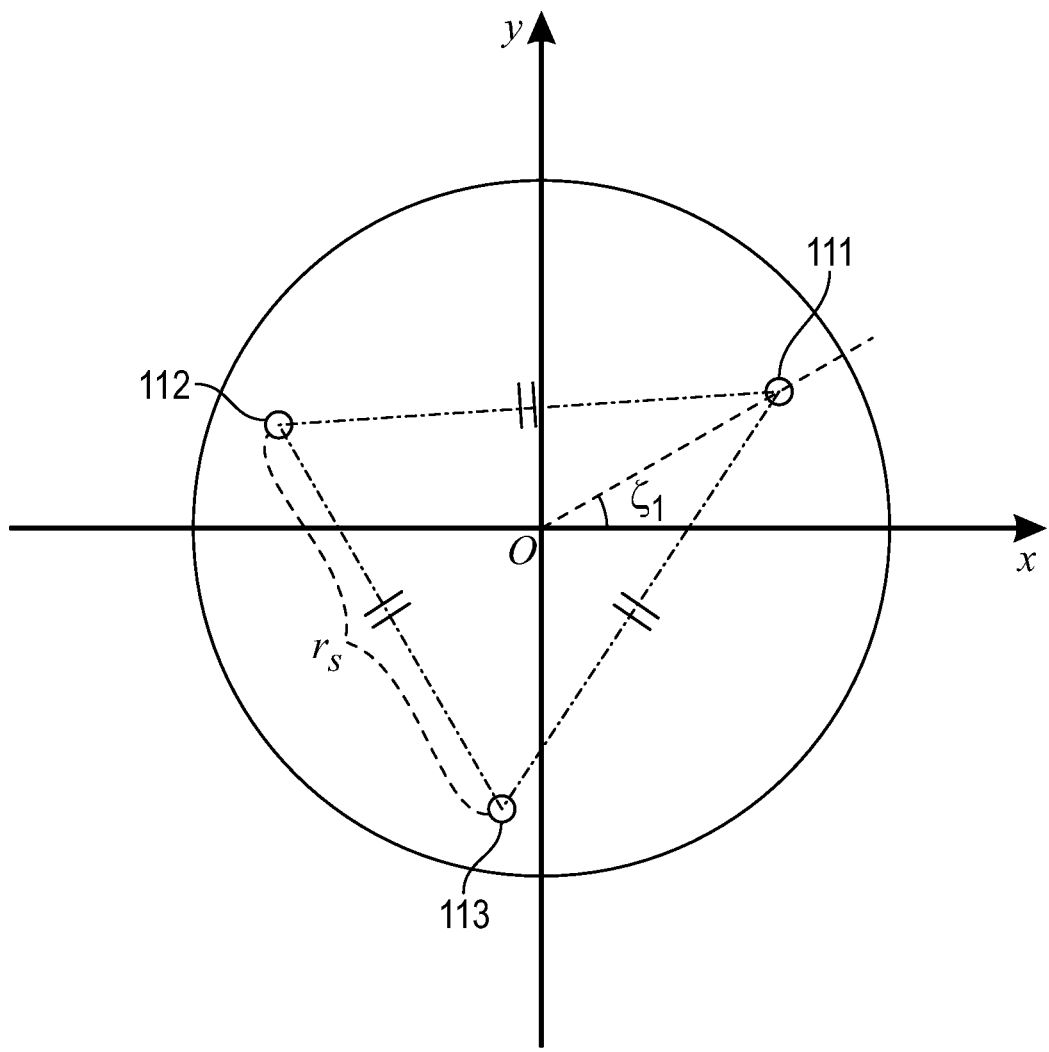
FIG. 3 is a top perspective view of the subject continuum robot, according to one or more embodiment of the subject apparatus, method or system.

In various embodiments, the wires 111-113 may be referred to as wires a, b, and c, counterclockwise in the in the xy plane; and the driving displacements of the wires for driving the n-th bending section are denoted by $l_{pna}$, $l_{pnb}$, and $l_{pnc}$. As illustrated in FIG. 3, the wires a-c are disposed at the vertices of an equilateral triangle whose side has a length $r_s$. The phase angle $\zeta_n$ is an angle that determines the wire arrangement for driving the n-th bending section. In the present embodiment, $\zeta_1$=0.

Based on the following assumptions, the kinematics of the continuum robot 100 may be derived: 1. In each bending section, the wires deform with a constant curvature; 2. Twisting deformation of the wires is not considered; 3. The wires do not deform in the longitudinal direction; 4. Friction between the wire guides and the wires is not considered.

With these assumptions in mind, we define the following symbols. First, the relationships between the driving displacements $l_{p1a}$, $l_{p1b}$, and $l_{p1c}$ of the wires a, b, and c and the bending angle $\theta_1$ and the rotational angle $\zeta_1$ of the first bending section are expressed as follows.

$$l_{p1a} = \frac{r_s}{\sqrt{3}}\cos\zeta_1 \theta_1 \qquad (1)$$

$$l_{p1b} = \frac{r_s}{\sqrt{3}}\cos\left(\frac{\pi}{6}+\zeta_1\right)\theta_1$$

$$l_{p1c} = \frac{r_s}{\sqrt{3}}\cos\left(\frac{\pi}{6}-\zeta_1\right)\theta_1$$

Next, for the continuum robot 100 including the plurality of bending sections 102, the relationships between the driving displacements $l_{pna}$, $l_{pnb}$, and $l_{pnc}$ of the wires a, b, and c and the bending angle $\theta_n$ and the rotational angle $\zeta_n$ of the distal end are obtained. The phase angle of the wires for driving the n-th bending section is expressed as follows, where e denotes the number of bending sections.

$$\xi_n = \frac{120}{e}n \qquad (2)$$

Thus, the driving displacements $l_{pna}$, $l_{pnb}$, and $l_{pnc}$ of the wires of the n-th bending section are expressed as follows.

$$l_{pna} = \frac{r_s}{\sqrt{3}}\cos(\zeta_n - \xi_n)\theta_n \qquad (3)$$

$$l_{pnb} = \frac{r_s}{\sqrt{3}}\cos\left(\frac{\pi}{6}+\zeta_n - \xi_n\right)\theta_n$$

$$l_{pnc} = \frac{r_s}{\sqrt{3}}\cos\left(\frac{\pi}{6}-\zeta_n + \xi_n\right)\theta_n$$

Figure 4:
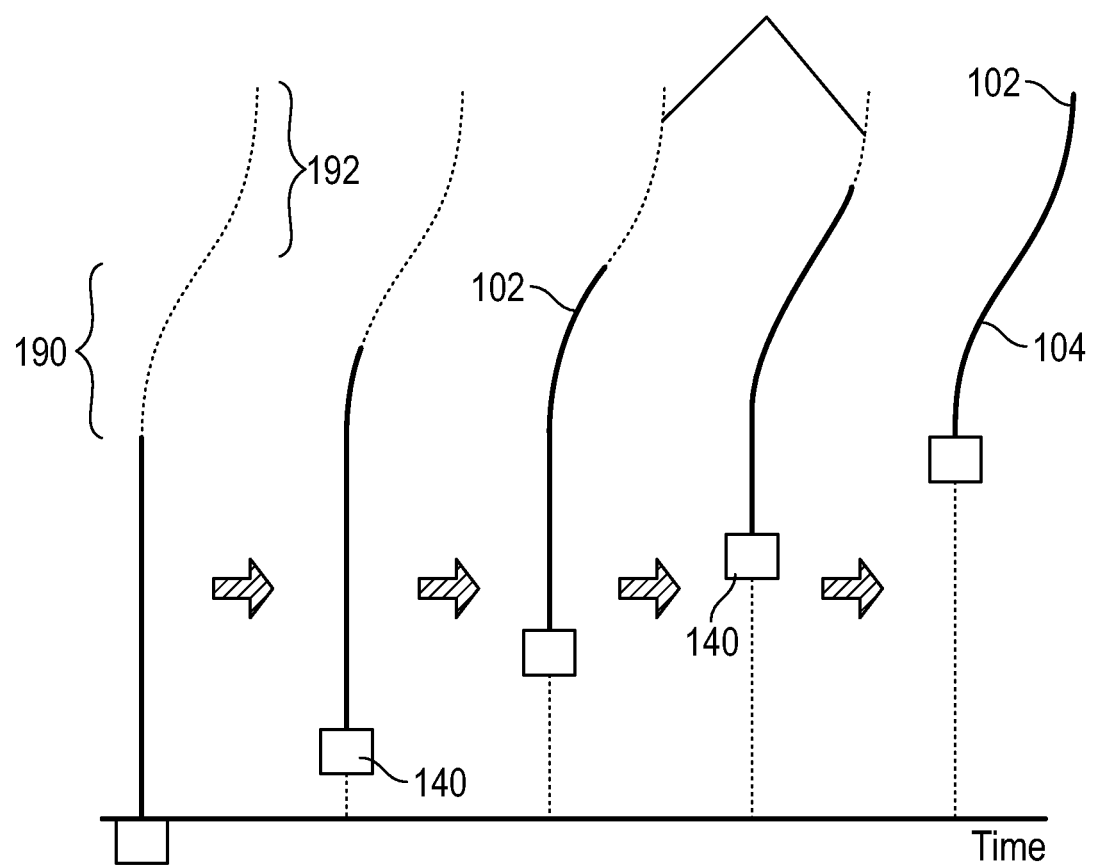
FIG. 4 illustrates an exemplary procedure of a leader following control utilized in the subject continuum robot, according to one or more embodiment of the subject apparatus, method or system.

The subject disclosure now provides details regarding a leader following control system. As illustrated in FIG. 4, leader following control is a method of performing control so that a following bending section passes through the same path as a path through which a bending section at the most distal end passes. Thus, the continuum robot 100 can advance through a space, while retaining the original bend initiated to avoid contact, as well as initiating new bends to avoid up and coming obstacles. In the leader following control, the path need not be determined beforehand. It is sufficient that the bending angle of the most distal end is continuously propagated to the following bending section by a bending section length. With this method, an operator can perform the leader following control in real time by only giving commands with respect to the bending angle of the most distal end of the robot 100 while advancement of the base is promoted by using a joystick or the like.

In further detailing FIG. 4, the horizontal line represents the passage of time as the robot 100 is advanced into the desired space, with the arrows signifying a progression of time. As the base 140 is advanced, the first bending section 102 takes the shape of the first desired bend (dotted line) 190. Further progression of the base 140 depicts the second bending section 104 taking the shape of the first desired bend 190, while the first bending section 102 takes the shape of the second desired bend 192. Additional bending sections and desired bends are contemplated and further claimed herein.

a) First Leader Following Control Method:

FIGS. 5(*a*) and 5(*b*) are graphs in which the horizontal axes represent the base displacement $z_b$ and the vertical axes respectively represent the bending angle θ and the rotational angle ζ. The thinner broken line represents a bending command given by an operator to the distal bending section, and the thicker broken line represents a bending command to the following bending section (follower). When an operator issues the distal bending command angle aB and the rotation command angle ab at the base displacement a, the bending angle for the follower may be automatically generated so that the bending angle and the rotational angle respectively become cD and cd at the base displacement c. Here, the base displacement c is determined so that the distance ac becomes the bending section length $l_d$. Then, the bending angle command of the follower is stored in the storage unit of the control processing device and read out in accordance with the base displacement. When the number of bending sections is two or more, it is possible to obtain bending angle command values for all bending sections by substituting the follower section in the above description with the distal end and by continuously performing the processing.

However, with this command value, when the base displacement is a or c, the bending and the rotational angles of the follower do not change, and the bending and rotational angle commands rise at the base displacement c, and therefore the continuum robot shows an abrupt behavior. Therefore, in the present disclosure, the bending angle command of the follower is interpolated so as to connect the point a and the point D and the rotational angle command is interpolated so as to connect the point a and the point d. The solid line in FIG. 5 represents the interpolated bending angle command for the follower. In the present disclosure, the angle command generation algorithm described in this section is referred to as a first leader follower control method.

b) Second Leader Following Control Method:

When the first leader follower control method described in the previous section is applied to a command value in which the rotational angle command ab exceeds 2π rad, the follower performs a rotational motion of one or more rotations around the z axis as the base advances. It is considered that a rotation operation command given by an operator to perform a rotational motion of one or more rotations around the z axis at the base displacement a is, for example, a motion of looking around at the position by using an image-capturing device disposed at the distal end of the robot. When the base advances after the look-around motion, the follower need not perform this motion. This is because it is difficult to dispose an image-capturing device or the like in the follower section, because the follower section is continuous with the leading section. Moreover, if this motion is performed in a path in a narrow and small space surrounded by obstacles, the motion range of the continuum robot becomes larger and contact with a surrounding elements is more likely to occur. Contact with surrounding elements is even more likely to occur when the length of the follower is large relative to the length of the leader.

Therefore, in the present embodiment, a second leader following control algorithm illustrated in FIG. 6 is created. As in FIG. 5(*b*), the solid line, the thick broken line, and the broken line respectively represent a bending angle command after interpolation, a bending angle command before interpolation, and a command by an operator. In the graph provided in FIG. 6, n denotes a natural number. The second leader follower control algorithm calculates a rotational angle command cd' as a rotation command for the second follower by subtracting a rotational motion of n rotations from the rotation command for the leader; and then interpolates a rotational angle command so as to connect the point a and the point d' in the same way as in the first follower control method. In this case, the rotational angle command cd' for the follower can be calculated from the following formulas.

$$\zeta_{cd'} = \zeta_{cd} \bmod 2\pi (\zeta_{cd} > 2\pi)$$

$$\zeta_{cd'} = \zeta_{cd} \bmod -2\pi (\zeta_{cd} < -2\pi) \quad (4)$$

Here, $\zeta_{cd}$ and $\zeta_{cd'}$ respectively denote the rotational angle commands cd and cd'. The symbol "mod" represents modular arithmetic, and the sign of the solution is the same as the divisor. Thus, it is possible to prevent a rotational motion of one or more rotations of the distal end of the robot around the z axis from propagating to the follower.

FIG. 7 illustrates a block diagram illustrating the control system 170 of the subject continuum robot 100, according to one or more embodiment of the subject apparatus, method or system. The control system 100 comprises a control target 172, a first leader following control algorithm 174, wherein $\theta_{tref}$ and $\zeta_{tref}$ denote a bending angle command value and a rotational angle command value of the distal end, and $\theta_{fref}$ and $\zeta_{fref}$ represent a bending angle command vector and a rotational angle command vector. In addition, $z_b$ denotes a base displacement command value, with the control system 170 further utilizing the modular arithmetic 178 shown in Formula (4). The kinematic calculation 178, described in the first chapter, calculates a wire driving amount from the bending and rotational angle command values.

Simulation:

All simulations are performed by using one or more embodiment of the leader follower control system described in the previously. The simulation is performed on a continuum robot that includes two bending sections each having a bending section length of 0.01 m.

Figure 8A:
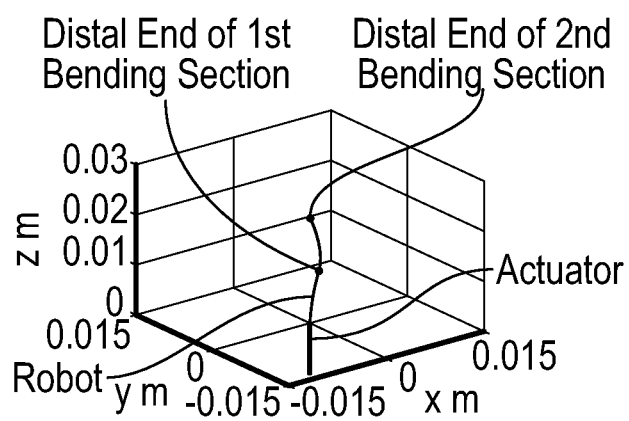
FIGS. 8(a) through 8(d) illustrate a simulation for controlling the subject continuum robot, according to one or more embodiment of the subject apparatus, method or system.
Figure 8B:
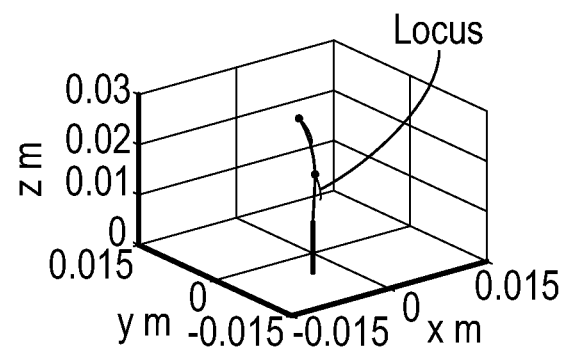
Figure 8C:
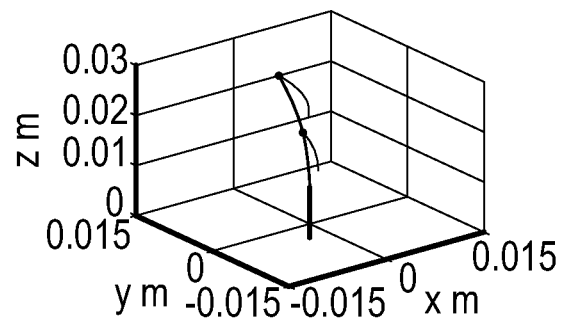
Figure 8D:
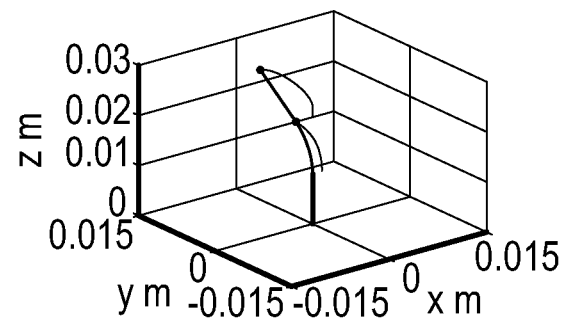
Figure 9A:
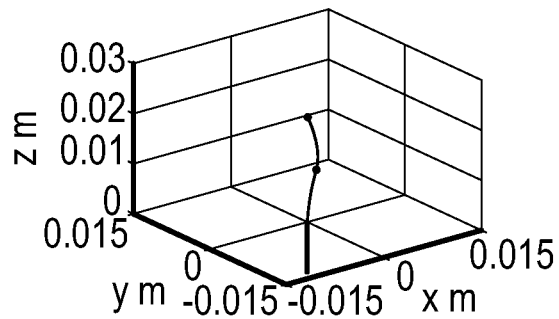
FIGS. 9(a) through 9(d) provide a simulation for controlling the subject continuum robot, according to one or more embodiment of the subject apparatus, method or system.
Figure 9B:
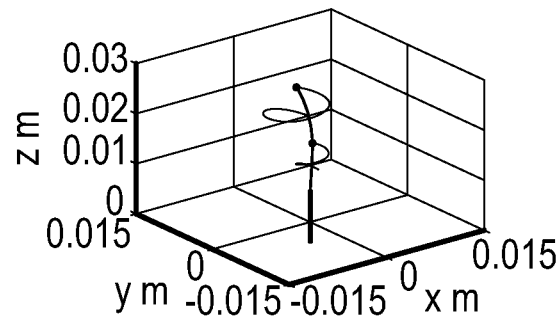
Figure 9C:
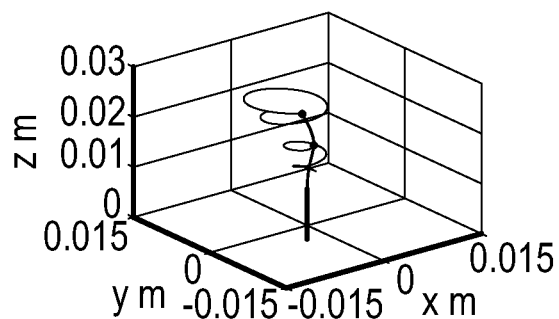
Figure 9D:
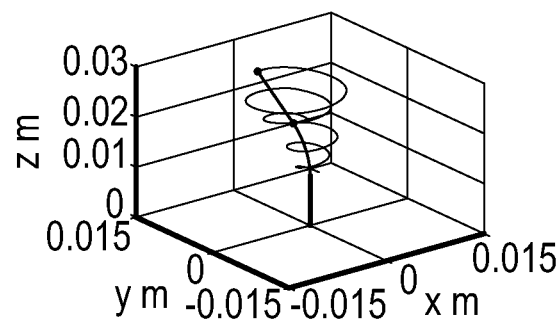

FIGS. 8(a) to 8(d) are simulations by stick diagrams illustration, wherein a stepwise manner, the postures when control using the second leader following control algorithm is performed until the base advances to 0.01 m. The solid line represents the shape of the robot, the black dot represents the distal end of each bending section, and the thin solid line represents the locus of the distal end of each bending section. The initial posture shown in FIG. 8(a) is expressed as follows.

$$z_b = 0, \quad [\theta_1 \ \theta_2] = \left[\frac{15}{180}\pi \frac{45}{180}\pi\right], \quad [\zeta_1 \ \zeta_2] = \left[0 \ \frac{810}{180}\pi\right]$$

In the initial posture, the second bending section has already performed a look-around motion of two rotations around the z axis. By performing control using the second leader follower control algorithm, the bending angle $\theta_1$ of the final posture is equal to the bending angle $\theta_2$ of the initial posture, and the rotational angle $\zeta_1$ of the final posture is an angle calculated from the bending angle $\zeta_2$ of the initial posture by performing modular arithmetic as follows.

$$z_b = 0.01, \quad [\theta_1 \ \theta_2] = \left[\frac{45}{180}\pi \frac{45}{180}\pi\right], \quad [\zeta_1 \ \zeta_2] = \left[\frac{90}{180}\pi \ \frac{810}{180}\pi\right]$$

It can be seen that, due to the modular arithmetic, the first bending section is not affected by the look-around motion of the second bending section and the leader follower control is performed smoothly. For comparison, FIG. 9(a) to 9(d) illustrate responses due to the first leader follower control algorithm. The look-around motion of the second bending section is directly propagated to the motion of the first bending section, and therefore the first bending section performs a rotational motion of two rotations as the base advances. Thus, it can be seen that not only the first bending section but also the second bending section rotate by a large amount as the base advances, and contact with external environment is likely to occur in a narrow and small space.

Second Embodiment

Figure 10:
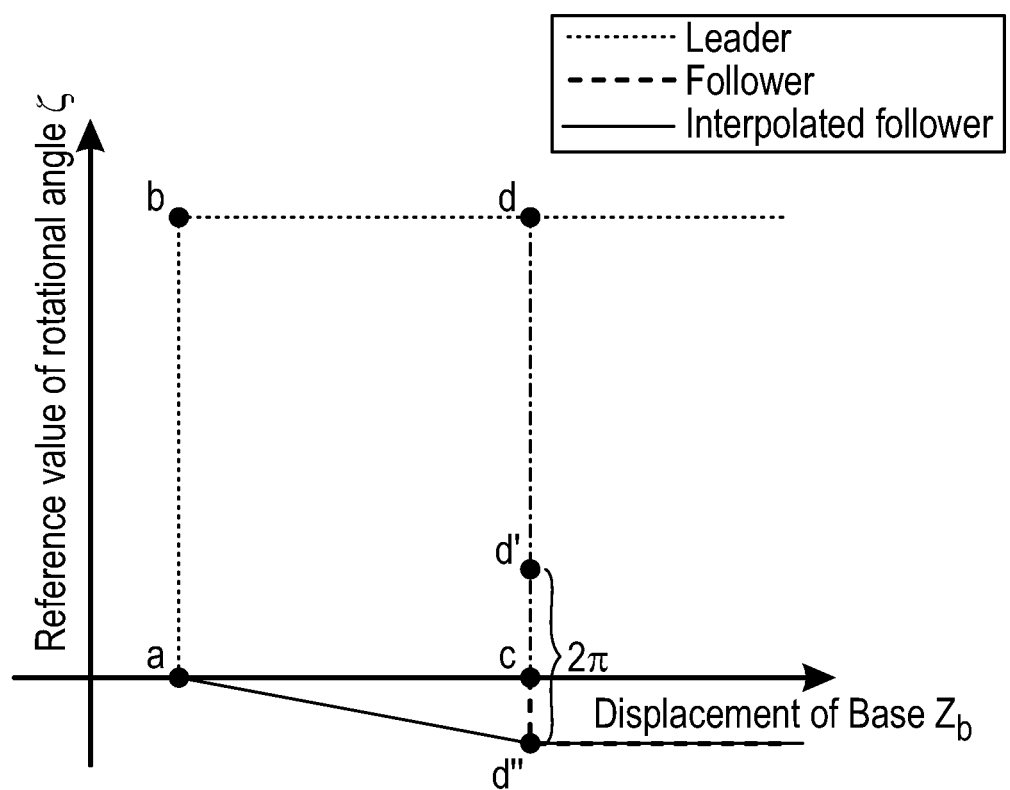
FIG. 10 illustrates a control system for controlling the subject continuum robot, according to one or more embodiment of the subject apparatus, method or system.

In the first Embodiment, although a rotational motion or one turn or more is subtracted from the most distal end, the following section performs a rotational motion in the same direction as the distal end. However, it is possible to reduce the rotation amount by rotating the following section in a direction opposite to the direction of the leading section. Therefore, in the present embodiment, a third leader follower control algorithm, as illustrated in FIG. 10, will be described.

As in the first embodiment, the solid line, the thick broken line, and the broken line respectively represent a bending angle command after interpolation, a bending angle command before interpolation, and a command by an operator. The third leader follower control algorithm performs the second leader follower control algorithm; and then calculates a rotational angle command cd″ as a rotation command for the follower by adding or subtracting $2\pi$ to or from the rotation command for the leader. Then, in the same way as in the second leader follower control method, the algorithm interpolates the rotational angle command so as to connect the point a and the point d″. In this case, the rotational angle command cd″ for the follower can be calculated from the following formulas.

$$\zeta_{cd''} = -\pi + \zeta_{cd'} \bmod \pi (\zeta_{cd'} > \pi)$$

$$\zeta_{cd''} = \pi + \zeta_{cd'} \bmod -\pi (\zeta_{cd'} < -\pi) \quad (5)$$

Thus, when compared with the second leader follower control algorithm, it is possible to further subtract a rotation amount of a half rotation.

Figure 11A:
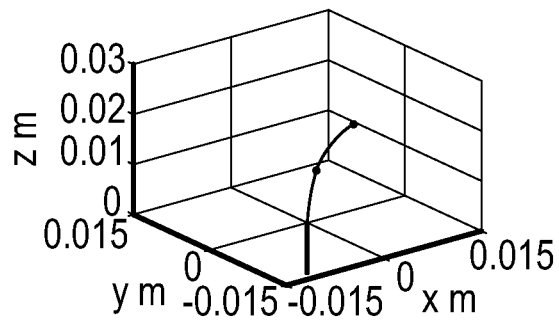
FIGS. 11(a) through 11(d) illustrate a simulation for controlling the subject continuum robot, according to one or more embodiment of the subject apparatus, method or system.
Figure 11B:
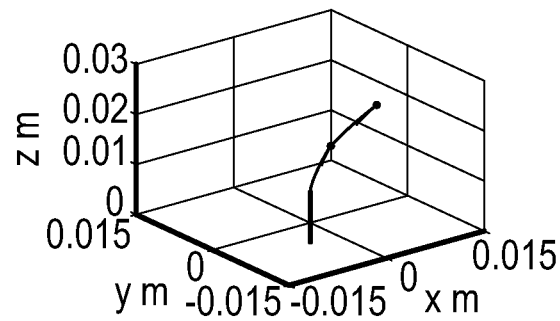
Figure 11C:
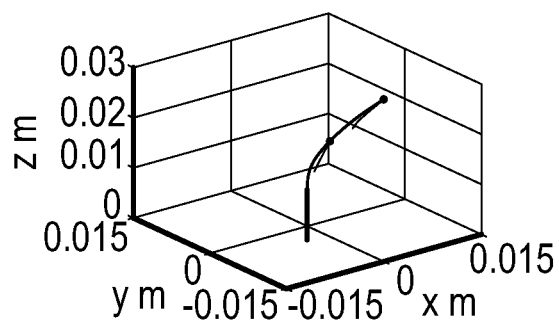
Figure 11D:
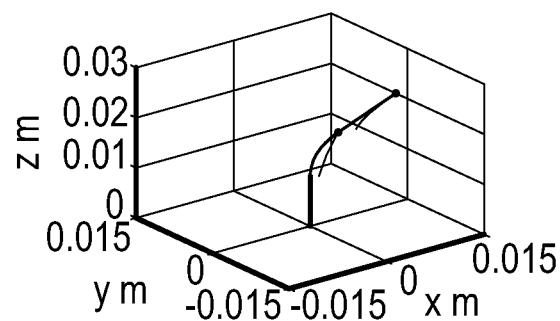
Figure 12A:
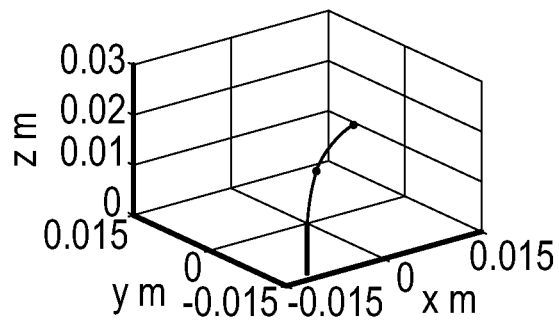
FIGS. 12(a) through 12(d) illustrate a simulation for controlling the subject continuum robot, according to one or more embodiment of the subject apparatus, method or system.
Figure 12B:
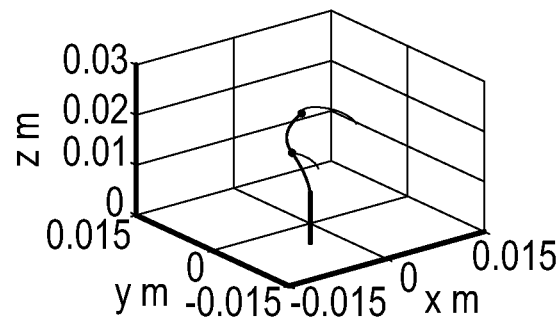
Figure 12C:
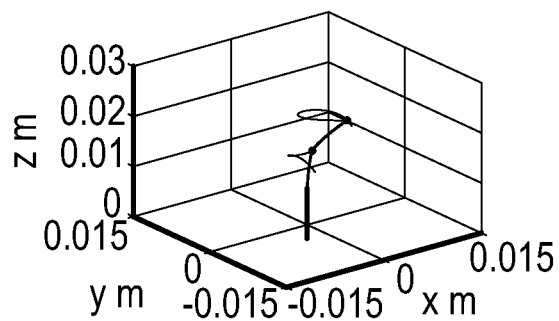
Figure 12D:
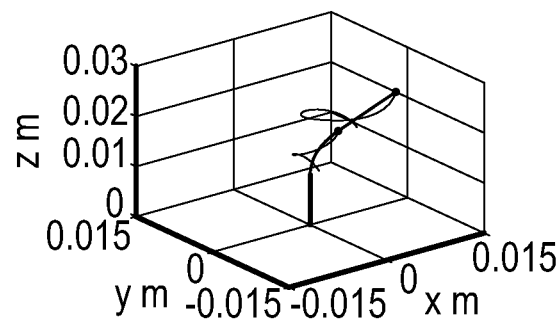

Simulation is performed by using the third leader follower control system. FIGS. 11(a) to 11(d) are stick diagrams illustrating, in a stepwise manner, the postures when control using the third leader follower control algorithm is performed and the base advances by 0.01 m. The solid line represents the shape of the robot, the black dot represents the distal end of each bending section, and the thin solid line represents the locus of the distal end of each bending section. The initial posture shown in FIG. 11(a) is expressed as follows.

$$z_b = 0, \quad [\theta_1 \ \theta_2] = \left[\frac{15}{180}\pi \frac{45}{180}\pi\right], \quad [\zeta_1 \ \zeta_2] = \left[0 \ \frac{330}{180}\pi\right]$$

By performing control using the third leader follower control algorithm, the bending angle $\theta_1$ of the final posture is equal to the bending angle $\theta_2$ of the initial posture, and the rotational angle $\zeta_1$ of the final posture is an angle calculated from the bending angle $\zeta_2$ of the initial posture by performing modular arithmetic as follows.

$$z_b = 0.01, \quad [\theta_1 \ \theta_2] = \left[\frac{45}{180}\pi \ \frac{45}{180}\pi\right], \quad [\zeta_1 \ \zeta_2] = \left[\frac{-30}{180}\pi \ \frac{330}{180}\pi\right]$$

It can be seen that, due to the modular arithmetic, the leader follower control is performed smoothly. For comparison, FIGS. 12(a) to 12(d) illustrate responses due to the second leader follower control algorithm. In the motion of the first bending section, the first bending section rotates in the same direction as the motion of the second bending section, and therefore the rotation amount due to the advancement of the base is large. Thus, it can be seen that, not only the first bending section but also the second bending section rotate by a large amount as the base advances, and contact with external environment is likely to occur in a narrow and small space.

Third Embodiment

Figure 13A:
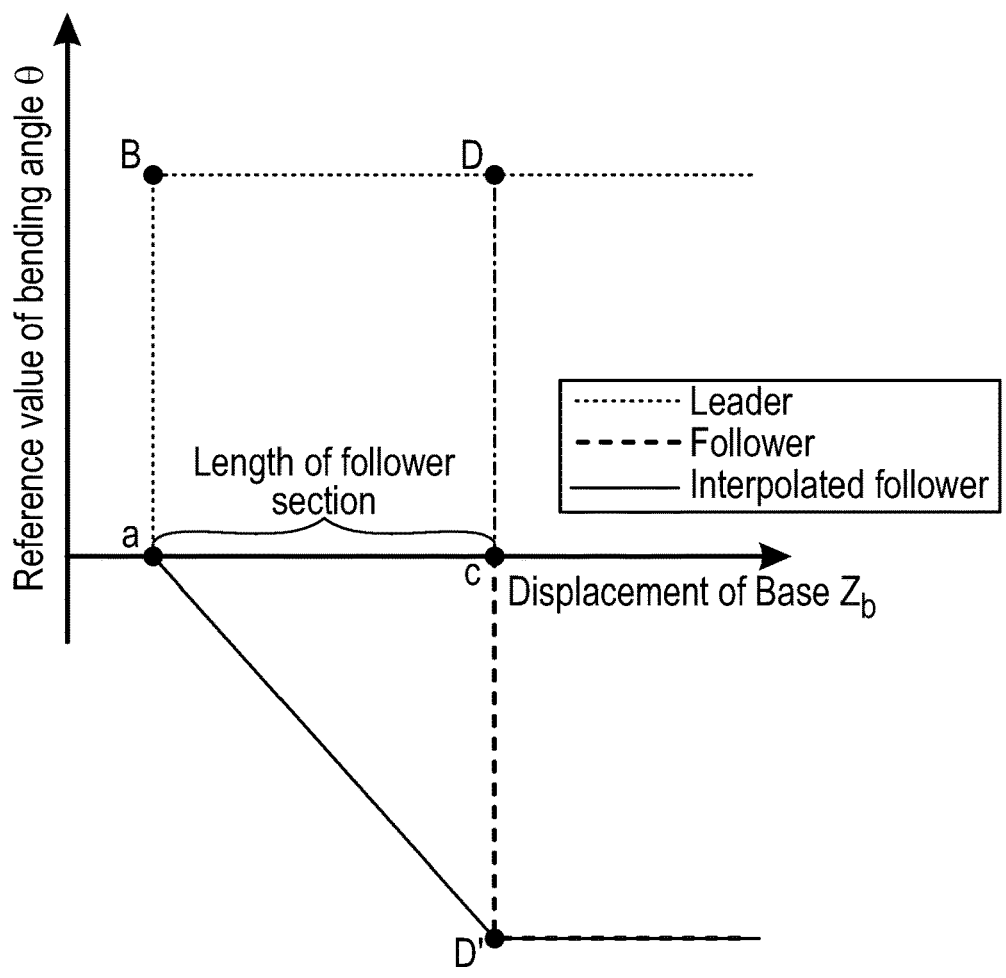
FIGS. 13(a) and 13(b) illustrate control systems for controlling the subject continuum robot, according to one or more embodiment of the subject apparatus, method or system.
Figure 13B:
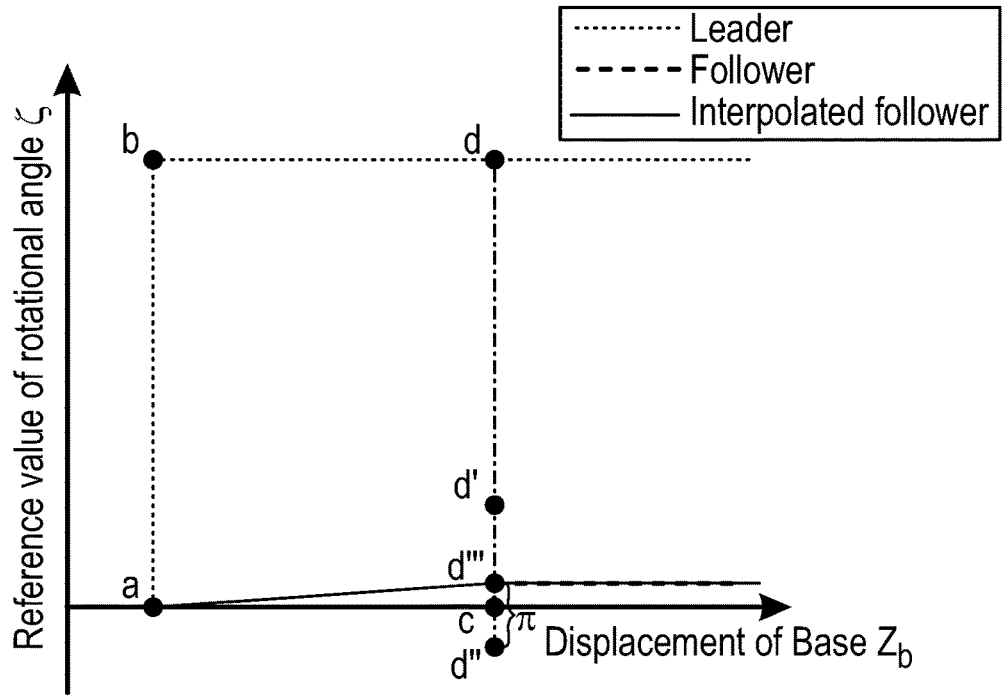

In the first and second embodiments, the rotation amount of the follower section is reduced by operating the rotational angle command. However, it is possible to further reduce the rotation amount by operating the bending angle command for the following section. Therefore, in the present embodiment, a fourth leader follower control algorithm, illustrated in FIG. 13, will be described.

As in the first embodiment, the solid line, the thick broken line, and the broken line respectively represent a bending angle command after interpolation, a bending angle command before interpolation, and a command by an operator. The fourth leader follower control algorithm performs the third leader following control algorithm; and then calculates a rotational angle command cd''' as a rotation command for the follower by adding or subtracting $\pi$ to or from a rotation command for the leader. Then, in the same way as in the third leader follower control method, the algorithm interpolates the rotational angle command so as to connect the point a and the point d'''. In this case, the rotational angle command cd''' for the follower can be calculated from the following formulas.

$$\zeta_{cd'''} = \zeta_{cd''} - \pi \quad \left(\frac{\pi}{2} < \zeta_{cd''} < \pi\right) \quad (6)$$

$$\zeta_{cd'''} = \zeta_{cd''} + \pi \quad \left(-\pi < \zeta_{cd''} < -\frac{\pi}{2}\right)$$

$$\theta_{cD'} = -\theta_{cD}$$

Here, $\theta_{cD'}$ and $-\theta_{cD}$ respectively denote the bending angle commands cD and cD'. Thus, when compared with the third leader follower control algorithm, it is possible to further subtract a rotation amount of a quarter rotation.

Figure 14A:
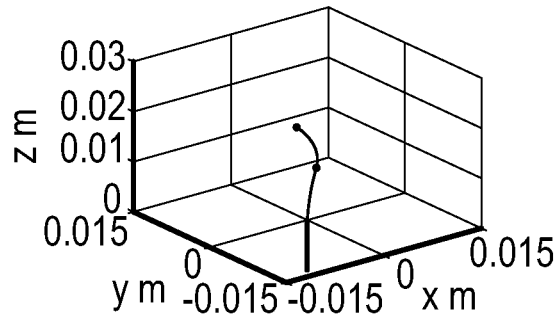
FIGS. 14(a) through 14(d) illustrate a simulation result for controlling the subject continuum robot, according to one or more embodiment of the subject apparatus, method or system.
Figure 14B:
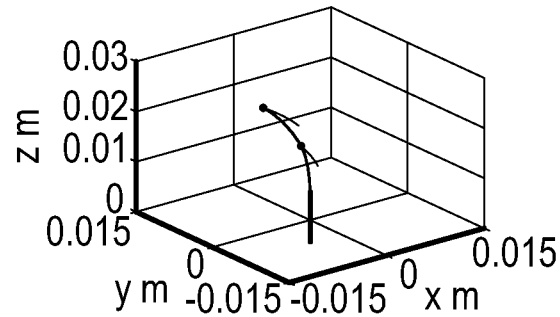
Figure 14C:
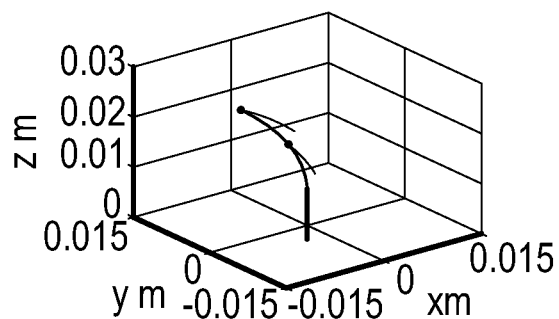
Figure 14D:
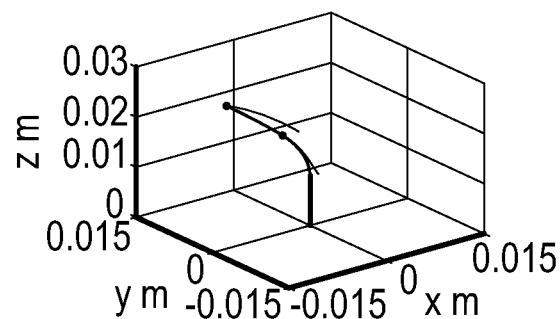
Figure 15A:
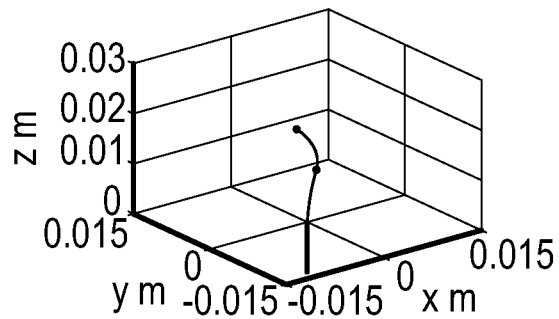
FIGS. 15(a) through 15(d) illustrate a simulation result for controlling the subject continuum robot, according to one or more embodiment of the subject apparatus, method or system.
Figure 15B:
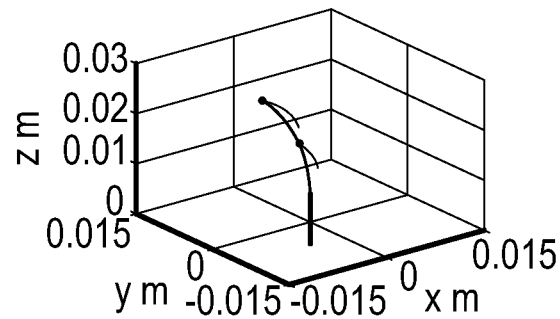
Figure 15C:
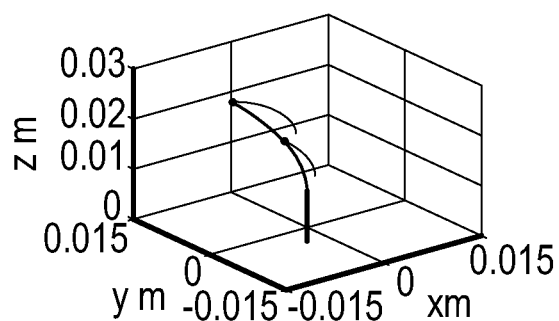
Figure 15D:
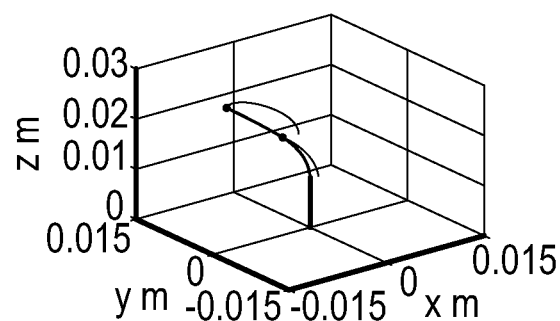

Simulation is performed by using the fourth leader follower control system. FIGS. 14(a) to 14(d) are stick diagrams illustrating, in a stepwise manner, the postures when control using the third leader follower control algorithm is performed and the base advances by 0.01 m. The solid line represents the shape of the robot, the black dot represents the end of each bending section, and the thin solid line represents the locus of the end of each bending section. The initial posture shown in FIG. 14(a) is expressed as follows.

$$z_b = 0, \quad [\theta_1 \ \theta_2] = \left[\frac{15}{180}\pi \ \frac{45}{180}\pi\right], \quad [\zeta_1 \ \zeta_2] = \left[0 \ \frac{160}{180}\pi\right]$$

By performing control using the fourth leader follower control algorithm, the bending angle $\theta_1$ of the final posture has a sign opposite to the sign of the bending angle $\theta_2$ of the initial posture, and the rotational angle $\zeta_1$ of the final posture is an angle calculated from the bending angle $\zeta_2$ of the initial posture by performing addition and subtraction as follows.

$$z_b = 0.01, \quad [\theta_1 \ \theta_2] = \left[\frac{-45}{180}\pi \ \frac{45}{180}\pi\right], \quad [\zeta_1 \ \zeta_2] = \left[\frac{-20}{180}\pi \ \frac{160}{180}\pi\right]$$

Thus, it can be seen that the leader follower control is performed smoothly. For comparison, FIGS. 12(a) to 12(d) illustrate responses due to the third leader follower control algorithm. In the motion of the first bending section, the rotation amount due to the advancement of the base is large. Thus, it can be seen that the distal end of the second bending section shows a locus on an arc, and contact with external environment is likely to occur in a narrow and small space.

As described above, in the embodiments according to the present disclosure, when a distal bending section performs a rotational motion wherein the angle ($\zeta$cd or $\zeta$t) of the rotational motion is 360 degrees or more, a controller performs bending control so that a proximal bending section follows the distal bending section while preventing the proximal bending section from performing a rotational motion of 360 degrees or more. That is, based on the direction of the distal bending section at the start and at the end of the rotational motion, the effect of unnecessary rotation is avoided, and therefore it is possible to reduce or eliminate issues, such as contact with external environment.

Thus, the following advantages are obtained. For example, consider a case wherein advancement of the continuum robot is stopped, the distal portion is rotated, image capturing is performed while looking around by using an objective lens disposed at the distal end of the continuum robot, and subsequently the robot is further advanced. In this case, it is considered that the look-around motion does not affect the advancement of the robot. By performing control according to the embodiments, it is possible to advance the proximal bending section so as to follow the distal bending section without being affected by the look-around motion.

In the first embodiment, the controller calculates an angle ($\zeta$cd' or $\zeta$t') that is 0 degrees or more and less than 360 degrees and that has the same phase as the angle of the rotational motion, and performs bending control of the proximal bending section based on the calculated angle. The aforementioned (4) may be used as the calculation formulas, or other theoretical formulas that provide the same result may be used. When realizing these formulas by using a computer, necessary approximation may be used.

In the second embodiment, regarding the proximal bending section, an angle ($\zeta$cd'' or $\zeta$t'') that is −180 degrees or more and less than 180 degrees and that has the same phase as the angle of the rotational motion is calculated, and bending control of the proximal bending section based on $\zeta$cd'' is performed. Thus, the rotational motion of the proximal bending section is limited to 180 degrees or less, and therefore unnecessary motion of the proximal portion is further suppressed. As in the first embodiment, the aforementioned (4) and (5) may be used as the calculation formulas, or other theoretical formulas that provide the same result may be used. When realizing these formulas by using a computer, necessary approximation may be used.

In the third embodiment, unnecessary rotational motion is suppressed by taking not only the rotational angle but also the bending direction into consideration. That is, the controller calculates an angle $\zeta cd'''$ obtained from the following formulas obtained by using the aforementioned (4), (5) and (6) using the angle $\zeta cd$ (or $\zeta t$) of the rotational motion of the distal bending section. The controller calculates an angle $\theta cD'$ obtained by using the aforementioned formula (6) using the bending angle $\theta cD$ of the distal bending section. Based on the values of $\zeta cd'''$ and $\theta cD'$, the proximal bending section is bent to be in a state in which the proximal bending section is bent by the bending angle $\theta cD'$ and rotated by the angle $\zeta cd'''$ of the rotational motion. As in the third embodiment, the aforementioned (4), (5) and (6) may be used as the calculation formulas, or other theoretical formulas that give the same result may be used. When realizing these formulas by using a computer, necessary approximation may be used.

In the embodiments described above, a case where a rotational motion of 360 degrees or more is performed at a predetermined base displacement zb is described. In another embodiment, processing intended as described above is applied also to a case where a rotational motion is performed for a slight change $\Delta z > 0$ in the base displacement. That is, when performing a rotational motion of an angle $\zeta cd$ (or $\zeta t$) of 360 degrees or more for $\Delta z$, an angle ($\zeta cd''$ or $\zeta t''$) that is 180 degrees or more and less than 180 degrees and that has the same phase as the angle as $\zeta cd$ (or $\zeta t$) is calculated, and the proximal bending section is controlled by using the angle $\zeta t''$ as a rotational angle command value. Thus, it is possible to reduce the proximal portion from performing an unnecessary following motion and to reduce or eliminate issues such as contact with external environment.

In the embodiments described above, when the distal bending section performs a general bending motion including a rotational motion at a certain base displacement zb, as illustrated in FIGS. 5(a) and 6, the proximal bending section is controlled so that the proximal bending section gradually bends while the proximal bending section becomes displaced by the length ac. In the other embodiment, when the distal bending section performs a bending motion by a predetermined angle while the distal bending section becomes displaced by a very short $\Delta z$ ($\geq 0$), the proximal bending section gradually bends by an angle corresponding to the predetermined angle while the proximal bending section becomes displaced for a distance larger than $\Delta z$.

The controller determines whether or not the distal bending section performs a rotational motion of an angle ($\zeta t$) that is 360 degrees or more for a predetermined change $\Delta z$ ($\geq 0$) of the base displacement zb. Such control may be determined based on the fact that the distal bending section has actually performed a rotational motion or may be determined based on the fact that a driving amount or a control value for performing the rotational motion has been input to the actuators 130 to 132. Alternatively, it may be determined when the driving amount or the control value is calculated by the controller.

It is possible to apply control according to the present disclosure not only in cases where the control described above is performed, but also in situations where the bending motion or the rotational motion of the proximal portion is performed, for example, depending on the history or the locus of the bending motion or the rotational motion of the distal portion.

In the embodiments described above, bending control of the distal end of the robot is determined based on the bending motion or the rotational motion of the distal portion. However, embodiments of the present disclosure are not limited to this embodiment. For example, in a case where a continuum robot includes three or more bending sections, two bending sections in the distal portion may perform a rotational motion in synchronism or the second most distal bending section may perform a rotational motion. The control algorithms described above may be applied to bending control of a bending section on the proximal side of the two bending sections. Such an embodiment is also included in the embodiments of the present disclosure. The point is that, when there are two bending sections in the distal portion, based on the rotational motion of bending sections in the distal portion, the aforementioned control algorithm may be applied to a bending section on the proximal side.

The controller may determine that the control algorithm according to an embodiment of the present disclosure is applied based on various set(s) of information. In the case where the control algorithm is not applied, for example, control shown in the graph illustrated in FIG. 5(b) is performed.

The invention claimed is:

1. A robotic apparatus comprising:
a continuum robot including a plurality of bending sections including a distal bending section and a proximal bending section wherein each of the bending sections are bent by at least one wire;
a driver that drives the wire;
a controller that controls a driving amount of the wire; and
a base affixed to the continuum robot and capable of moving the continuum robot,
wherein, when the base moves the continuum robot a displacement value, the distal bending section performs a rotational motion, and an angle ($\zeta t$) of the rotational motion is greater than 0 degrees, and
the controller controls the proximal bending section so as to follow the distal bending section while preventing the proximal bending section from performing a rotational motion of 360 degrees or more, based on a bending state of the distal bending section at a time when the distal bending section finishes the rotational motion.

2. The robotic apparatus according to claim 1,
wherein the controller calculates an angle ($\zeta t'$) that is 0 degrees or more and 360 degrees or less and the angle ($\zeta t'$) has a same phase as the angle ($\zeta t$) of the rotational motion, and performs bending control of the proximal bending section based on the calculated angle ($\zeta t'$).

3. The robotic apparatus according to claim 1,
wherein the controller performs bending control of the proximal bending section based on a value obtained by calculating an angle ($\zeta t'$) obtained by using the following formulas using the angle ($\zeta t$) of the rotational motion of the distal bending section $$\zeta t' = \zeta t \bmod 2\pi (\zeta t > 2\pi)$$

$$\zeta t' = \zeta t \bmod -2\pi (\zeta t < -2\pi).$$

4. The robotic apparatus according to claim 1,
wherein, regarding the proximal bending section, the controller calculates an angle ($\zeta t''$) that is −180 degrees or more and less than 180 degrees and that has a same phase as the angle ($\zeta t$) of the rotational motion, and performs bending control of the proximal bending section based on $\zeta t''$.

5. The robotic apparatus according to claim 1,
wherein the controller performs bending control of the proximal bending section based on a value obtained by calculating an angle $\zeta t''$ obtained by using the following formulas using the angle ($\zeta t$) of the rotational motion of the distal bending section $$\zeta t' = \zeta t \bmod 2\pi (\zeta t > 2\pi)$$

$$\zeta t' = \zeta t \bmod -2\pi (\zeta t < -2\pi)$$

$$\zeta t'' = -\pi + \zeta t' \bmod \pi (\zeta t' > \pi)$$

$$\zeta t'' = \pi + \zeta t' \bmod -\pi (\zeta t' < -\pi).$$

6. The robotic apparatus according to claim 1,
wherein the controller calculates an angle $\zeta t'''$ obtained by using the following formulas using the angle ($\zeta$t) of the rotational motion of the distal bending section $$\zeta t' = \zeta t \bmod 2\pi (\zeta t > 2\pi)$$

$$\zeta t' = \zeta t \bmod -2\pi (\zeta t < -2\pi)$$

$$\zeta t'' = -\pi + \zeta t' \bmod \pi (\zeta t' > \pi)$$

$$\zeta t'' = \pi + \zeta t' \bmod -\pi (\zeta t' < -\pi)$$

$$\zeta t''' = \zeta t'' - \pi (\pi/2 < \zeta t'' < \pi)$$

$$\zeta t''' = \zeta t'' + \pi (-\pi < \zeta t'' < -\pi/2),$$

calculates an angle $\theta'$ obtained by using the following formula using a bending angle $\theta$ of the distal bending section, $\theta' = -\theta$, and bends the proximal bending section to be in a state in which the proximal bending section is bent at the bending angle $\theta'$ and rotated by the angle $\zeta t'''$ of the rotational motion.

7. The robotic apparatus according to claim 1,
wherein, regarding the proximal bending section, when the distal bending section performs a rotational motion while the predetermined base displacement changes by a predetermined value and the angle ($\zeta$t) of the rotational motion is 360 degrees or more, regarding the proximal bending section, an angle ($\zeta t''$) that is −180 degrees or more and less than 180 degrees and that has a same phase as the angle of the rotational motion is calculated, and bending control of the proximal bending section is performed based on $\zeta t''$.

8. The robotic apparatus according to claim 1,
wherein, regarding the proximal bending section, the controller performs bending control based on bending control of the distal bending section during a period in which the base displacement changes by a predetermined value ($\Delta z'$).

9. The robotic apparatus according to claim 1,
wherein, when the base has the displacement value, the controller determines whether or not the distal bending section performs a rotational motion whose angle ($\zeta$t) is 360 degrees or more.

10. The robotic apparatus according to claim 1,
wherein the distal bending section includes two independent bending sections.

11. The robotic apparatus according to claim 1,
further comprising a medial bending section wherein the medial bending section is bent by at least one wire.

* * * * *